April 14, 1936. T. V. BUCKWALTER 2,037,209
LOCOMOTIVE CROSSHEAD
Filed Oct. 11, 1933
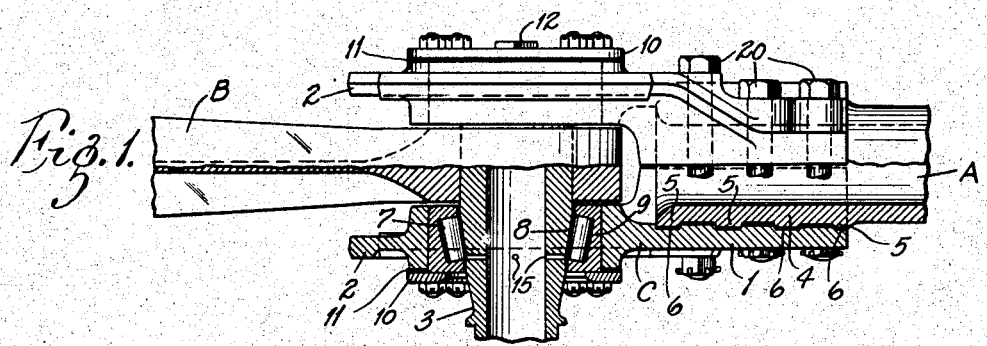
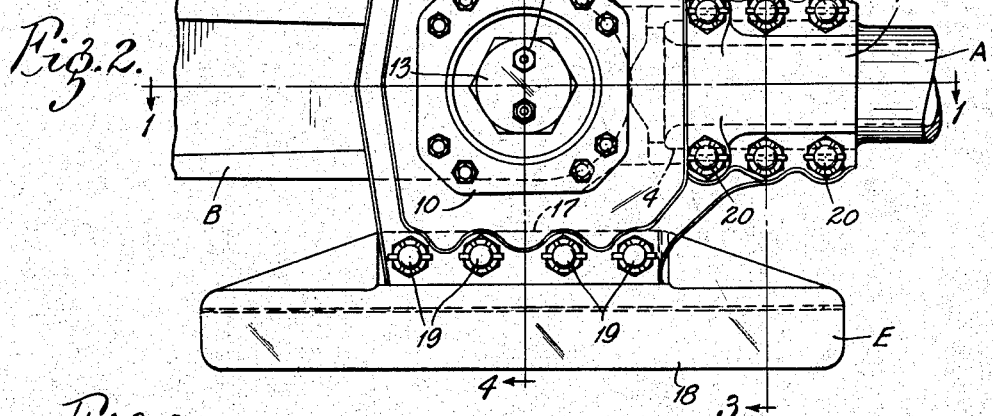
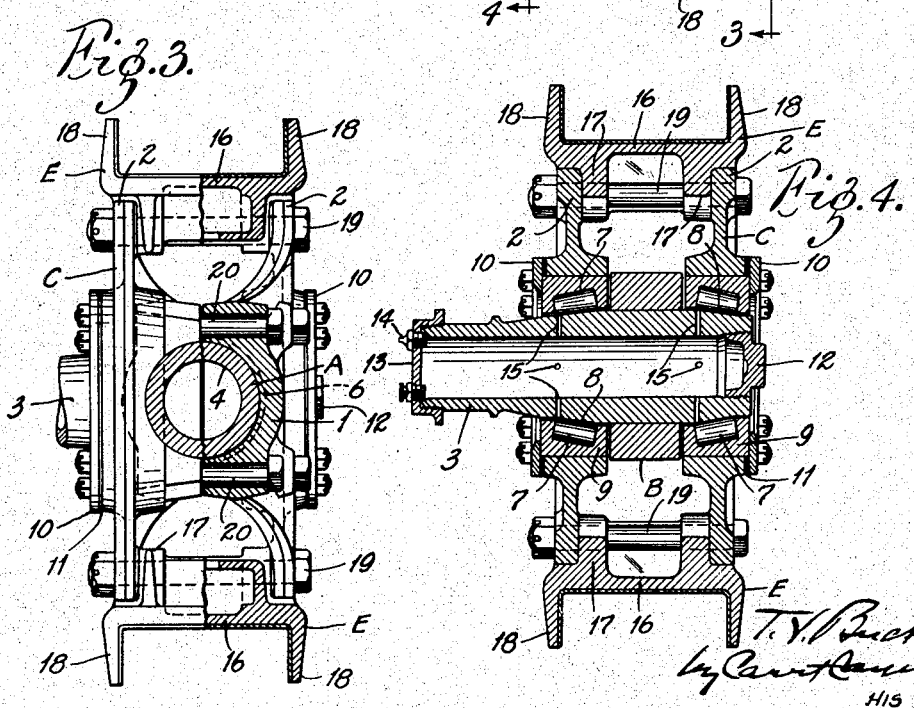
INVENTOR:
T. V. Buckwalter
HIS ATTORNEYS.

Patented Apr. 14, 1936

2,037,209

UNITED STATES PATENT OFFICE 2,037,209

LOCOMOTIVE CROSSHEAD

Tracy V. Buckwalter, Canton, Ohio, assignor to The Timken Roller Bearing Company, Canton, Ohio, a corporation of Ohio Application October 11, 1933, Serial No. 693,101

6 Claims. (Cl. 287—100)

This invention relates to crossheads, particularly crossheads of the type used on locomotives for connecting the main rod to the piston rod. It has for its principal object to provide a crosshead which can be quickly and easily removed and replaced without removing the wrist pin from the main rod and which will be light in weight, strong and durable and of simple and economical construction. The invention consists in the crosshead and in the parts and combinations and arrangements of parts hereinafter described and claimed.

In the accompanying drawing, which forms a part of this specification and wherein like symbols refer to like parts wherever they occur, Fig. 1 is a part plan and part horizontal sectional view of a locomotive crosshead embodying my invention, Fig. 2 is a side elevation of said crosshead, Fig. 3 is a vertical cross-section on the line 3—3 in Fig. 2; and Fig. 4 is a vertical cross-section on the line 4—4 in Fig. 2.

The present crosshead is particularly adapted for transferring the reciprocating motion of the piston rod A of a locomotive to the main or connecting rod B thereof. Said crosshead comprises a forked or yoke member C having a shank portion 1 provided with a longitudinal bore, which receives the rear end portion of the piston rod A, and horizontally spaced parallel branches 2, between which the forward end of the main rod B is pivotally secured by means of a horizontal wrist pin 3 that extends transversely of said branches. The branches 2 of the yoke member C and the portion of the main rod B disposed therebetween are provided with alined openings adapted to receive the wrist pin 3. The middle portion of the wrist pin is cylindrical and has a tight fit in the opening in the main rod; and the ends of said wrist pin are rotatably supported in the openings in the respective branches of the yoke member.

The piston rod A comprises a cylindrical tube having an enlarged rear end portion 4 which fits within the cylindrical bore in the shank portion 1 of the crosshead. Relative endwise movement of the piston rod A and yoke member C is prevented by means of a series of outstanding annular ribs 5 on the enlarged end 4 of the piston rod that mate with corresponding annular grooves 6 in the bore of the shank portion 1 of the yoke member. These interfitting ribs and grooves are preferably provided with tapered side faces that provide slight clearance spaces between the top and bottom faces of the ribs and grooves and thus insure a tight wedging engagement therebetween. The rib and groove located adjacent to the point where the large end 4 of the piston rod merges into the smaller diameter thereof are made shallower than the remaining ribs and grooves in order to avoid weakening the piston rod at said point.

The wrist pin 3 is supported at its outer ends in antifriction bearings, preferably taper roller bearings, mounted in the registering openings in the branches of the yoke member C. Each of the taper roller bearings comprises a series of conical bearing rollers 7 interposed between a conical inner raceway 8 formed on the wrist pin itself and a conical cup or outer bearing member 9 seated within the opening in the adjacent branch of the yoke member. The outer bearing member 9 is held in the opening provided therefor in the branch of the yoke member by means of an annular plate 10 that is removably secured to the outer face of said branch with its inner marginal portion overlapping the outer end of said outer bearing member. Adjustment of the outer bearing member to take up wear in the bearing is accomplished preferably by thin shims 11 interposed between the annular plate 10 and the branch of the yoke member. Endwise movement of the wrist pin is prevented by the engagement of the conical bearing rollers with the conical raceways 8 on the wrist pin and the retaining plates 10 at the outer ends of the bearings.

The wrist pin 3 is made hollow so as to provide a chamber or reservoir therein for lubricant. The inner end of the wrist pin is closed by means of a closure member in the form of a threaded plug 12; and the outer end of said pin is closed by means of a threaded cap 13, provided with a suitable oil-feed fitting 14. The wrist pin is provided with radial lubricant passageways 15 leading from the interior thereof to the outer end of each conical raceway portion 8 of said pin. With this arrangement, the movement of the wrist pin causes the lubricant therein to pass out through radial passageways 15 into the space occupied by the bearing rollers 7.

The yoke member C is provided with top and bottom shoes E adapted to slide on parallel ways or guides (not shown). Each shoe E is substantially of channel-shaped cross-section; that is it comprises a horizontal web portion 16 provided on one side with spaced parallel flanges 17, which extend between the branches 2 of the yoke member C, and on the other side with spaced parallel flanges 18 adapted to straddle the spaced parallel ways or guides. The flanges 17 of each shoe fit between and bear flatwise against the inner faces of the branches 2 of the yoke member and are secured to said branches by through bolts 19 that pass through registering openings in said branches and said flanges.

The shank portion 1 of the yoke member C is split or divided longitudinally in a vertical plane passing through the axis of its piston rod receiving opening to form duplicate half sections, each forming one-half of the shank portion of said yoke and one of the branches thereof. The two half sections of the yoke member C are secured together by horizontal cross bolts 20 that serve to firmly clamp the mating portions of the shank 1 about the enlarged rear end portion 4 of the piston rod A, with the tapered ribs and grooves of said shank and piston in wedging engagement with each other.

The foregoing crosshead construction has numerous advantages. The forming of the yoke member C in separable sections permits the removal of the yoke member and the wrist pin bearings without removing the wrist pin from the main rod B by merely removing the bolts 19, which secure the yoke sections together, and the bolts 20, which secure the shoes F to the branches of the yoke member. The shoes act both as struts and ties for maintaining the branches of the yoke members in proper spaced relation and are readily detachable for repair or replacement without affecting the other parts of the crosshead. The shoes and yoke member, being separable, are adapted to be made of materials best suited for the duty imposed thereon. The clamping engagement of the tapered interfitting ribs 5 and grooves 6 of the piston rod and yoke forms a strong and rigid connection between said parts, which dispenses with the use of cross keys for connecting these parts together and permits the piston rod to be made from tube stock instead of the solid stock hereinbefore employed.

In addition to being much lighter and much stronger than previous crossheads, my crosshead has the great advantage of being well adapted to manufacture by drop-forging and well adapted to heat treatment. The yoke member, being made of duplicate half sections, requires the use of only one forging die.

Obviously, the hereinbefore described crosshead construction admits of considerable modification without departing from the invention. Therefore, I do not wish to be limited to the precise construction shown and described.

What I claim is:

1. A crosshead comprising a yoke having a tubular shank portion and spaced branches provided with alined openings, a member interposed between said branches, a wrist pin having a tight fit in an opening provided therefor in said member and having its ends extending into the openings in said branches, and roller bearings in the openings in said branches for rotatably supporting the ends of the wrist pin therein, said yoke being made of separable sections, thereby permitting the removal of said yoke without removing said wrist pin from said member.

2. A crosshead comprising a yoke having a tubular shank portion and spaced branches provided with alined openings, a member interposed between said branches, a wrist pin having a tight fit in an opening provided therefor in said member, and roller bearings in the openings in said branches for rotatably supporting the ends of the wrist pin therein, said yoke being split longitudinally so as to permit removal thereof without removing the wrist pin from said member.

3. A locomotive crosshead comprising a yoke having a tubular shank portion and spaced branches provided with registering openings, a piston rod extending into said shank portion, and a main rod interposed between said spaced branches and having a wrist pin rigid therewith with its ends disposed in said openings, the bore of said shank portion and the portion of the piston rod engaged therewith having interfitting annular ribs and grooves, said yoke being made of separable sections, thereby and means permitting the removal and replacement of said yoke member without disturbing said pin.

4. A locomotive crosshead comprising a yoke member having a tubular shank portion and spaced branches provided with openings, a piston rod extending into said shank portion, a main rod interposed between said branches, a wrist pin having a tight fit in an opening provided therefor in said main rod and having its ends extending into the openings in said branches, said shank portion being split longitudinally to form sections, and means for clamping said sections around said piston rod.

5. A locomotive crosshead comprising a yoke having a tubular shank portion and spaced branches provided with alined openings, a tubular piston rod extending into said tubular shank portions, a main rod interposed between said branches, a wrist pin having a tight fit in said main rod and extending into the openings in said branches, said shank portion being split longitudinally, and means for clamping the split portions of said shank portion around said tubular piston rod.

6. A locomotive crosshead comprising a yoke having a tubular shank portion and spaced branches provided with alined openings, a tubular piston rod extending into said tubular shank portion, a main rod interposed between said branches, a wrist pin having a tight fit in said main rod and extending into the openings in said branches, said shank portion being split longitudinally, and means for clamping the split portions of said shank portion around said tubular piston rod, the cooperating surfaces of said shank portion and said piston rod being provided with cooperating ribs and grooves.

TRACY V. BUCKWALTER.

CERTIFICATE OF CORRECTION.

Patent No. 2,037,209.  April 14, 1936.

TRACY V. BUCKWALTER.

It is hereby certified that error appears in the printed specification of the above numbered patent requiring correction as follows: Page 2, second column, line 24, claim 3, strike out the words "and means"; and that the said Letters Patent should be read with this correction therein that the same may conform to the record of the case in the Patent Office.

Signed and sealed this 12th day of May, A. D. 1936.

Leslie Frazer
Acting Commissioner of Patents.

(Seal)